Patented Oct. 19, 1954

2,692,243

UNITED STATES PATENT OFFICE 2,692,243

HETEROCYCLIC POLYMERS CONTAINING HETERO-N AND 1,4-METHYLENE GROUPS

Michael M. Szwarc, Salford, England

No Drawing. Application July 10, 1952, Serial No. 298,181

Claims priority, application Great Britain February 10, 1949

16 Claims. (Cl. 260—2.1)

The invention of this application, which is a continuation-in-part of application Serial No. 141,600, filed on January 31, 1950 (now abandoned), relates to new and useful polymers and processes for the production thereof.

In earlier application for patent, Serial No. 48,339, filed on September 8, 1948, there is described a process for the production of a solid polymer in which the vapour of an aromatic hydrocarbon such as para-xylene or 1,4-dimethyl naphthalene is pyrolyzed by being subjected to a temperature between 700° and 1000° C. for not more than 10 seconds and the resulting vapours are cooled at a temperature at which a solid polymer is desposited.

It has now been found that heterocyclic compounds corresponding to the carbocyclic compounds referred to above and containing only carbon and nitrogen atoms within the ring or rings also yield useful solid polymers on pyrolysis of the vapour of the compound and subsequent cooling.

Thus, the present invention consists in a process for the production of a solid polymer in which the vapour of an aromatic heterocyclic compound consisting of from one to two six-membered rings containing not more than two hetero atoms within the ring structure, the hetero atoms consisting of nitrogen and being non-adjacent when two are present, and having two methyl groups substituted in the para or 1,4 positions of one ring and formed of condensed or fused rings when consisting of two rings, is pyrolyzed by being subjected to a temperature between 700° and 1000° C. for not more than ten seconds and the resulting vapours are cooled to a temperature at which a polymer is deposited.

The present invention also consists in a solid polymer, the monomeric unit of which is a radical of an aromatic heterocyclic compound which radical consists of from one to two six-membered rings and can be represented by a Kekule type structure, contains not more than two hetero atoms, the hetero atoms consisting of nitrogen and being non-adjacent when two are present, has two CH2 groups substituted in the para or 1,4 positions of one ring and is formed of condensed or fused rings when consisting of two rings.

By an aromatic heterocyclic compound is meant one which has a similar structure to that of the corresponding aromatic carbocyclic compound and can be represented by a formula of the Kekule type. Thus the term includes such compounds as pyridine, pyrazine and quinoline but excludes such compounds as piperidine and piperazine.

Examples of compounds which may be used as starting materials for the production of polymers in accordance with the invention are 2,5-dimethyl pyrazine; 2,5-lutidine; 2,5-dimethyl pyrimidine; 5,8-dimethyl quinoline; 1,4-dimethyl isoquinoline; 5,8-dimethyl isoquinoline; 5,8-dimethyl pyrido[4,3-b]pyridine; 5,8-dimethyl pyridol[3,4-b]pyridine; 5,8-dimethyl quinazoline; 5,8-dimethyl quinoxaline.

In the process of the invention polymerization appears to take place spontaneously on condensation by cooling of the monomer vapour produced by the pyrolysis. The cooling may take place in contact with a cool surface on which a polymer in the form of a film is deposited. A quantity of relatively low molecular weight polymer in the form of a resinous product may be deposited in addition.

The temperature to which the monomer vapour formed by pyrolysis should be cooled for condensation and polymerization to take place can easily be determined by experiment. It apparently depends on the partial vapour pressure of the monomer in the gas phase and on its volatility. The upper limit appears to increase with increasing partial vapour pressure and with decreasing volatility.

The pyrolysis step of the process of the invention is preferably carried out by subjecting the vapour of the heterocyclic compound to a temperature between 800° and 900° C. for from 0.1 to 1 second.

High pressures e. g. pressures above about 3 atmospheres should be avoided in carrying out the process of the invention. Preferably the partial pressure exerted by the vapour which is subjected to pyrolysis is below atmospheric pressure and still more preferably below 100 mm. Hg pressure. The vapour subjected to pyrolysis may be diluted with an inert carrier gas such as nitrogen or carbon dioxide in order to maintain a low partial vapour pressure of the heterocyclic compound.

Following are examples of processes for the production of new polymers in accordance with the invention:

Example 1

The vapour of 2,5-dimethyl pyrazine, i. e.

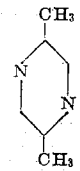

was passed at a pressure of 5 to 10 mm. Hg through a tube heated to 800° to 820° C. at such a rate that the vapour was subjected to this temperature for about 0.3 second. The vapours leaving the tube were passed into a trap in which they were cooled to room temperature.

Two products as follows were obtained on cooling:

(a) A relatively low molecular weight polymer in the form of a resinous product which was soluble in organic solvents and in dilute mineral acids.

(b) A relatively high molecular weight solid polymer in the form of a film which was insoluble in organic solvents, swelled in glacial acetic acid and was soluble in dilute aqueous mineral acids. The polymer was precipitated from solution in dilute mineral acids by the addition of ammonia or caustic soda.

Example 2

The vapour of 2,5-lutidine, i. e.

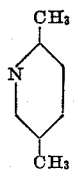

was passed at a pressure of 5 to 10 mm. Hg through a tube heated to 800° to 820° C. at such a rate that the vapour was subjected to this temperature for about 0.3 second. The vapours leaving the tube were passed into a trap in which they were cooled to room temperature.

Two products as follows were obtained on cooling:

(a) A relatively low molecular weight polymer in the form of a resinous product which was soluble in organic solvents and in dilute mineral acids.

(b) A relatively high molecular weight solid polymer in the form of a film which was insoluble in organic solvents, swelled in glacial acetic acid and was soluble in dilute aqueous mineral acids. The polymer was precipitated from solution in dilute mineral acids by the addition of ammonia or caustic soda.

Example 3

The vapour of 5,8-dimethyl quinoline, i. e.

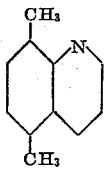

was passed at a pressure of 5 to 10 mm. Hg through a tube heated to about 800 to 820° C. at such a rate that the vapour was subjected to this temperature for about 0.3 second. The vapours leaving the tube were passed into a trap in which they were cooled to 100° C.

A solid polymer in the form of a film was deposited in the trap. This film was insoluble in boiling organic solvents and also in boiling dilute aqueous mineral acids. It was, however, soluble in concentrated sulphuric acid at about 80 to 100° C. It was precipitated from such a solution with water.

The monomeric units of the high molecular weight solid polymers produced in Examples 1, 2 and 3 above are the corresponding di-valent radicals of the starting materials, that is

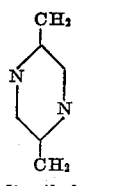
2,5-dimethylene pyrazine

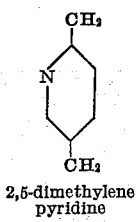
2,5-dimethylene pyridine and

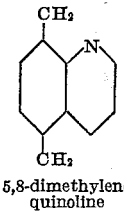
5,8-dimethylene quinoline respectively.

This has been confirmed by analysis and by the formation of the corresponding di-iodomethyl compounds when the pyrolyzed vapours are reacted with iodine vapour.

Example 4

The process described in Example 1 was repeated with 2,5-dimethylpyrimidine as starting material instead of 2,5-dimethyl pyrazine. A similar high molecular weight solid polymer was obtained, the monomeric unit of the polymer being 2,5-dimethylene pyrimidine.

Example 5

The process described in Example 3 was repeated with 1,4-dimethyl isoquinoline as starting material instead of 5,8-dimethyl quinoline. A similar high molecular weight solid polymer was obtained, the monomeric unit being 1,4-dimethylene isoquinoline.

The high molecular weight solid polymers produced as described above are soluble in mineral acids and can be spun from the acid solution into an alkaline bath to give filaments. They have also been found suitable for use as base exchange resins.

I claim:

1. A solid polymer the monomeric unit of which is a radical of an aromatic heterocyclic compound which radical consists of from one to two six-membered rings capable of being represented by a Kekule type structure, contains not more than two hetero atoms, the hetero atoms consisting of nitrogen and being non-adjacent when two are present, and has only two substituents, these being two $CH_2$ groups in the 1,4 positions of one ring and is formed of fused rings when consisting of two rings.

2. A solid polymer the monomeric unit of which is a radical of an aromatic heterocyclic compound which radical consists of a single six-membered ring capable of being represented by a Kekule type structure, contains not more than two hetero atoms, the hetero atoms consisting of nitrogen and being non-adjacent when two are present, and has only two substituents, there being two $CH_2$ groups in the para positions of the ring.

3. A solid polymer the monomeric unit of which is 2,5-dimethylene pyridine.

4. A solid polymer the monomeric unit of which is 2,5-dimethylene pyrazine.

5. A solid polymer the monomeric unit of which is 5,8-dimethylene quinoline.

6. A process for the production of a solid polymer in which the vapour of an aromatic heterocyclic compound which consists of from one to two six-membered rings capable of being represented by a Kekule type structure, contains not more than two hetero atoms within the ring structure, the hetero atoms consisting of nitrogen and being non-adjacent when two are present, which contains only two substituents, these being two methyl groups in the 1,4 positions of one ring and is formed of fused rings when consisting of two rings, is pyrolyzed by being subjected to a temperature between 700 and 1000° C. for not more than ten seconds and the resulting vapours are cooled to a temperature at which a solid polymer is deposited.

7. A process for the production of a solid polymer in which the vapour of an aromatic heterocyclic compound consisting of a six-membered ring of the Kekule type containing not more than two hetero atoms, which hetero atoms consist of nitrogen and are non-adjacent when two are present and which contains only two substituents, these being two methyl groups in the para positions, is pyrolyzed by being subjected to a temperature between 700 and 1000° C. for not more than ten seconds and the resulting vapours are cooled to a temperature at which a solid polymer is deposited.

8. The process of claim 6 in which the vapour of the heterocyclic compound is subjected to the temperature of pyrolysis for from 0.1 to 1 second.

9. The process of claim 6 in which the pyrolysis is carried out with the vapour of the heterocyclic compound exerting a pressure not exceeding atmospheric pressure.

10. The process of claim 9, in which said pressure does not exceed 100 mm. Hg.

11. The process of claim 6 in which the pyrolysis is carried out with the vapour of the heterocyclic compound diluted with an inert gas.

12. The process of claim 6 in which the pyrolysis is carried out at a temperature between 800 and 900° C.

13. The process of claim 6 in which after pyrolysis the resulting vapours are cooled in contact with a cold surface to a temperature at which the polymer is deposited on the said surface in the form of a film.

14. A process for the production of a solid polymer in which the vapour of 2,5-lutidine is pyrolyzed by being subjected to a temperature between 700 and 1000° C. for not more than ten seconds and the resulting vapours are cooled to a temperature at which a solid polymer is deposited.

15. A process for the production of a solid polymer in which the vapour of 2,5-dimethyl pyrazine is pyrolyzed by being subjected to a temperature between 700 and 1000° C. for not more than ten seconds and the resulting vapours are cooled to a temperature at which a solid polymer is deposited.

16. A process for the production of a solid polymer in which the vapour of 5,8-dimethyl quinoline is pyrolyzed by being subjected to a temperature between 700 and 1000° C. for not more than ten seconds and the resulting vapours are cooled to a temperature at which a solid polymer is deposited.

References Cited in the file of this patent

FOREIGN PATENTS

| Number | Country | Date |
|---|---|---|
| 1,011,584 | France | Apr. 2, 1952 |